United States Patent
Bulthaup et al.

(10) Patent No.: US 7,747,355 B2
(45) Date of Patent: Jun. 29, 2010

(54) ELECTRICAL POWER GENERATOR WITH ADAPTIVE COUPLING

(75) Inventors: Colin Bulthaup, San Francisco, CA (US); Saul Griffith, San Francisco, CA (US); Dan Goldwater, Berkeley, CA (US); Corwin Hardham, San Francisco, CA (US); George Homsy, San Francisco, CA (US); Eric Wilhelm, Oakland, CA (US); Brian Warshawsky, San Francisco, CA (US); Mitch Heinrich, Oakland, CA (US); Michael Lin, San Francisco, CA (US); Benji Rappoport, San Francisco, CA (US); John Lewis, San Francisco, CA (US)

(73) Assignee: Potenco, Inc., San Francisco, CA (US)

( * ) Notice: Subject to any disclaimer, the term of this patent is extended or adjusted under 35 U.S.C. 154(b) by 168 days.

(21) Appl. No.: 11/983,428

(22) Filed: Nov. 7, 2007

(65) Prior Publication Data

US 2008/0150495 A1    Jun. 26, 2008

Related U.S. Application Data

(60) Provisional application No. 60/864,772, filed on Nov. 7, 2006, provisional application No. 60/861,999, filed on Nov. 29, 2006.

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| F03G 7/08 | (2006.01) |
| H02K 7/18 | (2006.01) |
| H02P 7/32 | (2006.01) |
| H02P 25/30 | (2006.01) |
| B60Q 1/00 | (2006.01) |
| B60Q 1/26 | (2006.01) |
| F21L 13/00 | (2006.01) |

(52) U.S. Cl. .................. 700/287; 700/286; 700/288; 700/290; 700/296; 290/1 R; 290/1 C; 290/4 A; 290/31; 318/141; 322/10; 322/2 R; 322/11; 322/17; 362/192

(58) Field of Classification Search ......... 700/286–290, 700/296; 290/1 R, 1 C, 4 A, 31; 318/141; 322/10, 2 R, 7, 11, 17; 362/192
See application file for complete search history.

(56) References Cited

U.S. PATENT DOCUMENTS 3,873,817 A * 3/1975 Liang .................. 700/287

(Continued)

OTHER PUBLICATIONS

Bullis, Kevin. "Powering the $100 Laptop" [online]. Jul. 2006. [Retrieved on Jul. 29, 2008]. Retrieved from the Internet: <URL: http://www.technologyreview.com/read_article.aspx?id=17194&ch=infotech&a=f>.

*Primary Examiner*—Ramesh B Patel
(74) *Attorney, Agent, or Firm*—Van Pelt, Yi & James LLP

(57) ABSTRACT

A method of coupling a mechanical power source through an electrical power generator to an electrical load is disclosed. A characteristic of an electrical output is measured from the electrical power generator produced during a power generation cycle during which there is a coupling of the mechanical power source through the electrical power generator to the electrical load. The coupling of the mechanical power source is adjusted through the electrical power generator to the electrical load during a subsequent power generation cycle based at least in part on the measured characteristic of the electrical output.

29 Claims, 12 Drawing Sheets

U.S. PATENT DOCUMENTS

| | | | |
|---|---|---|---|
| 4,057,904 A | 11/1977 | Vrabel et al. | |
| 4,145,885 A | 3/1979 | Solell | |
| 4,228,360 A | 10/1980 | Navarro | |
| 4,261,562 A | 4/1981 | Flavell | |
| 4,360,860 A | 11/1982 | Johnson et al. | |
| 4,455,614 A * | 6/1984 | Martz et al. | 700/288 |
| 4,539,484 A | 9/1985 | Suggs | |
| 4,701,835 A | 10/1987 | Campagnuolo et al. | |
| 4,770,279 A | 9/1988 | Shiozaki et al. | |
| 5,067,601 A | 10/1989 | Castens | |
| 5,066,867 A | 11/1991 | Shim | |
| 5,219,053 A | 6/1993 | Castens | |
| 5,343,991 A | 9/1994 | Premiski et al. | |
| 5,359,229 A | 10/1994 | Youngblood | |
| 5,434,454 A * | 7/1995 | Farkas | 290/4 R |
| 5,796,240 A | 8/1998 | Saito et al. | |
| 5,798,632 A * | 8/1998 | Muljadi | 322/29 |
| 6,034,492 A | 3/2000 | Saito et al. | |
| 6,125,978 A | 10/2000 | Ando et al. | |
| 6,133,642 A | 10/2000 | Hutchinson | |
| 6,178,523 B1 * | 1/2001 | Klein | 714/24 |
| 6,230,496 B1 * | 5/2001 | Hofmann et al. | 60/706 |
| 6,288,463 B1 | 9/2001 | Tada et al. | |
| 6,346,784 B1 * | 2/2002 | Lin | 318/9 |
| 6,525,996 B1 * | 2/2003 | Miyazawa | 368/204 |
| 6,664,759 B1 | 12/2003 | Goris | |
| 6,676,056 B2 | 1/2004 | Peter | |
| 6,855,016 B1 | 2/2005 | Jansen | |
| 6,914,340 B2 | 7/2005 | Becker et al. | |
| 6,924,571 B2 | 8/2005 | Bye | |
| 7,019,495 B2 * | 3/2006 | Patterson | 322/7 |
| 7,021,978 B2 * | 4/2006 | Jansen | 440/6 |
| 7,045,912 B2 | 5/2006 | Leijon et al. | |
| 7,071,659 B1 * | 7/2006 | Torrey et al. | 318/254.1 |
| 7,087,001 B1 | 8/2006 | Ihli | |
| 7,105,982 B1 * | 9/2006 | Hagood et al. | 310/319 |
| 7,129,592 B1 * | 10/2006 | Yetter | 290/1 A |
| 7,164,212 B2 | 1/2007 | Leijon et al. | |
| 7,180,258 B2 | 2/2007 | Specht et al. | |
| 7,319,278 B2 | 1/2008 | Gehring | |
| 2002/0125360 A1 | 9/2002 | Peter | |
| 2003/0042741 A1 | 3/2003 | Hartman et al. | |
| 2003/0066923 A1 | 4/2003 | Peter | |
| 2004/0043873 A1 | 3/2004 | Wilkinson et al. | |
| 2004/0204294 A2 | 10/2004 | Wilkinson et al. | |
| 2004/0263099 A1 * | 12/2004 | Maslov et al. | 318/254 |
| 2005/0006961 A1 | 1/2005 | Shen | |
| 2005/0012487 A1 * | 1/2005 | Skeist et al. | 318/727 |
| 2005/0083000 A1 | 4/2005 | Specht et al. | |
| 2005/0121915 A1 | 6/2005 | Leijon et al. | |
| 2005/0124471 A1 | 6/2005 | Wilkinson | |
| 2005/0178632 A1 * | 8/2005 | Ross | 191/10 |
| 2005/0184689 A1 * | 8/2005 | Maslov et al. | 318/254 |
| 2005/0247814 A1 | 11/2005 | Prokscha et al. | |
| 2005/0284976 A1 | 12/2005 | Holbein et al. | |
| 2006/0094965 A1 | 5/2006 | Voss et al. | |
| 2006/0097096 A1 | 5/2006 | Heckmayr | |
| 2006/0192386 A1 | 8/2006 | Rome | |
| 2006/0208606 A1 | 9/2006 | Hirzel | |
| 2006/0267406 A1 * | 11/2006 | Mehrer et al. | 307/9.1 |
| 2007/0037667 A1 | 2/2007 | Gordon | |
| 2007/0108767 A1 | 5/2007 | Hirose et al. | |
| 2007/0145745 A1 * | 6/2007 | Woods et al. | 290/1 A |
| 2007/0164568 A1 | 7/2007 | Greenspan et al. | |
| 2007/0176426 A1 | 8/2007 | Hirose et al. | |
| 2007/0205350 A1 | 9/2007 | Shimada et al. | |
| 2008/0048509 A1 | 2/2008 | Murakami et al. | |
| 2008/0048510 A1 | 2/2008 | Onodera et al. | |
| 2008/0054858 A1 | 3/2008 | Uchimi et al. | |
| 2008/0067982 A1 * | 3/2008 | Dooley | 322/22 |
| 2008/0150378 A1 | 6/2008 | Heinrich et al. | |
| 2008/0150493 A1 | 6/2008 | Bulthaup et al. | |
| 2008/0150495 A1 | 6/2008 | Bulthaup et al. | |
| 2008/0157531 A1 | 7/2008 | Bulthaup et al. | |
| 2008/0157536 A1 | 7/2008 | Bulthaup et al. | |
| 2008/0157540 A1 * | 7/2008 | Fattal | 290/40 R |
| 2008/0157615 A1 | 7/2008 | Bulthaup et al. | |
| 2008/0157635 A1 | 7/2008 | Bulthaup et al. | |
| 2008/0157636 A1 | 7/2008 | Bulthaup et al. | |
| 2008/0157637 A1 | 7/2008 | Bulthaup et al. | |
| 2008/0202447 A1 | 8/2008 | Kochi et al. | |
| 2008/0231234 A1 | 9/2008 | Mah | |
| 2009/0121496 A1 * | 5/2009 | Jabaji et al. | 290/40 B |

\* cited by examiner

ELECTRICAL POWER GENERATOR WITH ADAPTIVE COUPLING

CROSS REFERENCE TO OTHER APPLICATIONS

This application claims priority to U.S. Provisional Patent Application No. 60/864,772 entitled SMART HUMAN POWER GENERATION filed Nov. 7, 2006 which is incorporated herein by reference for all purposes.

This application claims priority to U.S. Provisional Patent Application No. 60/861,999 entitled SMART HUMAN POWER GENERATION filed Nov. 29, 2006 which is incorporated herein by reference for all purposes.

BACKGROUND OF THE INVENTION

Electronic devices such as portable computers and portable communication devices require electrical power suitable for semiconductor and other electronics technologies. In some instances it is too difficult or too expensive to use regional power grids or local generators of electricity to power electronics devices. It would be useful if an electrical generator suitable for efficient and extended use with a human or animal providing mechanical input power could be developed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for coupling a mechanical power source through an electrical power generator to an electrical load are disclosed. The mechanical power source may be a human or an animal. In some embodiments, a characteristic of an electrical output, such as the cycle frequency or output power, from the electrical power generator produced during a power generation cycle during which there is a coupling of the mechanical power source through the electrical power generator to the electrical load is measured.

A controller adjusts the coupling of the mechanical power source through the electrical power generator to the electrical load during a subsequent power generation cycle based at least in part on the measured characteristic of the electrical output. In various embodiments, the adjustment may include:

increasing the average output power of the electrical power generator attainable by the mechanical power source at a given level of effort;

attempting to maintain a desired cycle frequency of the electrical power generator;

attempting to keep the average output power of the electrical power generator below a specified threshold; or attempting to increase the electrical power generator lifetime.

Figure 1A:
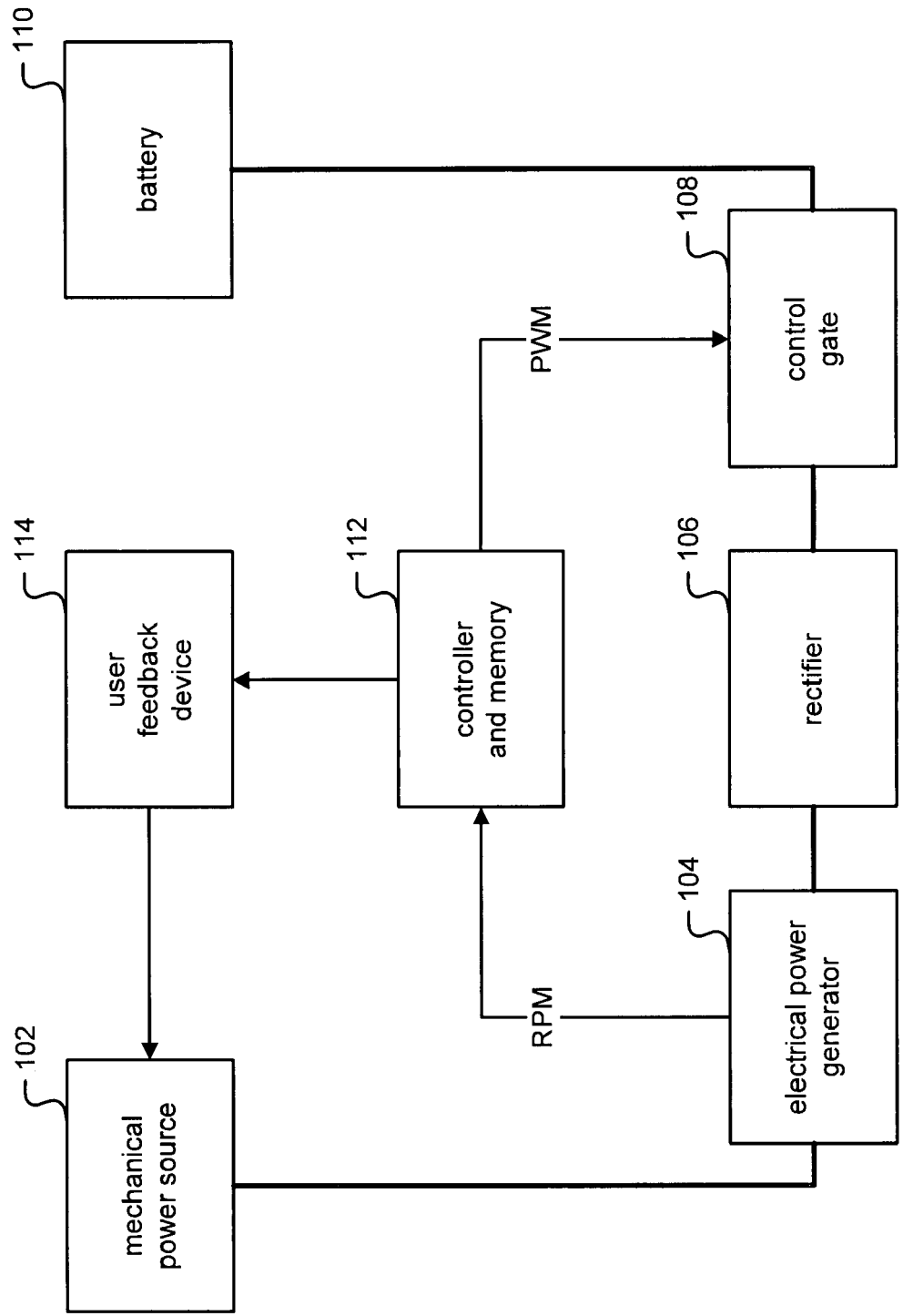
FIG. 1A is a block diagram illustrating an embodiment of a system for coupling a mechanical power source through an electrical power generator to an electrical load.

FIG. 1A is a block diagram illustrating an embodiment of a system for coupling a mechanical power source through an electrical power generator to an electrical load. In the example shown, mechanical power source 102 is connected through electrical power generator 104, through rectifier 106 and through control gate 108 to a battery 110. A controller and memory 112 takes input from electrical power generator 104 and provides controls for control gate 108. The controller and memory 112 optionally provide an output to a user feedback device 114 which is sent back to the mechanical power source 102.

The electrical power generator 104 has an input stage to harness power from a human or animal. There are different mechanical configurations by which to accomplish this, including: a Push Pull stage, an Erg stage, a Step stage, a Bicycle stage and a Crank stage.

Push-pull Stage. The Push-Pull input stage comprises a capstan with a double-ended rope, cord, or other such tensile member affixed at its center to the capstan. There are two ergonomic grips affixed to the distal ends of the rope.

Operation is as follows:

1. The initial state has one end of the rope fully wound on the capstan, and the other end unwound. The wound rope is pulled, unwinding it and transferring mechanical energy to the capstan. As this happens, the other end of the rope is wound on the capstan.

2. At the end of this stroke, the process is reversed: The other rope (now wound) is pulled, unwinding it and winding the first rope, and also transferring mechanical to the capstan.

3. The process repeats ad infinitum: The two ends of the rope are pulled alternately, each winding the other and transferring power to the capstan.

Erg Stage. This input stage is based on the same type of biometric motion used in a rowing exercise machine: A tee-shaped handle or other ergonomic grip is affixed to the end of a long rope, tape, cord, or other windable tensile structure. The other end is affixed to a winding drum, and wound completely around the drum. The drum is fitted with a rotary return spring, so when the tape is unwound, the drum rewinds the tape by the action of the return spring. The drum drives the mechanical coupling system through a freewheel, in such a way that only the outward (unwinding) pull on the tape transfers mechanical energy. Because of this one-way freewheeling, the electrical power generator 104 can continue spinning in the driven direction, even as the return spring on the drum is rewinding the tape onto the drum. There is also an alternative embodiment in which mechanical energy is transferred to the electrical power generator 104 during both the pulling cycle and while the tape is being rewound onto the drum, for example if the tape is somewhat stiff and the user can push it back into the device rather than having it retracted by a spring.

In either the Push-pull or Erg stage, the handle comes close to the rest of the mechanical system when the string or tape is fully retracted. Provision may be made on the case holding the mechanical system, to stow the handles in a specific way, for instance by snapping them into one or more recesses on the case. This makes the entire unit compact and wieldy for transport, when it is not in use.

An additional enhancement may be that when the handle is stowed, by virtue of its stowage position it may obscure the entry point of the string into the case. This can serve to protect the unit from water, dust or other contaminants entering etc, through the string entry point.

In either the Push-pull or the Erg stage, provision may be made in the design of the unit for attaching it to a heavy or fixed object such as for example, a tree, pole, a heavy piece of furniture, or a doorknob. In various embodiments, a rope, a strap, or a tape forms a loop emanating at one end from the case, looping around the fixed object, and returning to the case in some sort of removable, adjustable attachment.

Any removable, adjustable attachment can be used. For example, a spring-loaded cleat, a spring-loaded buckle, a fixed double-insertion buckle, a fixed double-insertion buckle, a buckle such as those found on luggage straps, a ratchet cleat such as found on sailboats, a jam cleat such as found on sailboats, and a one-way friction ratchet composed of a cylindrical roller and an inclined plane are used in different embodiments.

Step Stage. The Step input stage, is quite similar to the Push-pull stage. But instead of using power from the hands and arms, this configuration is intended to draw power from the person's mimicry of the act of climbing stairs. In this configuration, the base unit is attached to an immovable object or to part of the person's body, and the feet are inserted into two ergonomic stirrups. The feet are then "pedaled" back and forth, in a stair-climbing motion, thereby transferring mechanical energy to the capstan.

As in the Push-pull or Erg configurations, the Step case may have provision on the case for stowing the stirrups, and also may have any of the mentioned provisions for attaching the base unit to an immovable object.

Bicycle Stage. The Bicycle input stage uses a pedaling motion to capture mechanical energy. The person sits upon a seat and turns a set of pedals, similar to the act of pedaling a bicycle. Instead of transferring mechanical energy to a wheel, though, it is transferred by means of the mechanical coupling system, to the electrical power electrical power generator 104.

The mechanical coupling may be a gear set, or it may be a belt- or chain-drive directly from the pedal set. It may also be a friction drive operating on the surface of a bicycle tire, if a tire and wheel are fitted. In fact, if a real bicycle is used, this system may be used to capture energy at the same time the bicycle is actually being ridden.

Crank Stage. The crank input stage uses a crank arm that is attached to a rotating shaft that is coupled to the electrical power generator 104. The mechanical coupling may be by way of a gear set, belt or chain drive, or direct connection, for example. The crank arm may be extendable in order to get a longer lever arm and thus better efficiency while still stowing away in a small volume.

The mechanical coupling is the portion of the system responsible for drawing mechanical energy from the capstan, and transmitting it to the electrical power generator 104. In the Push-pull, the Erg, and the Step input stage configurations, it is advantageous to use as small a capstan diameter as possible. This is so that a moderate pull velocity will translate to a large rotational speed at the generator shaft. If the capstan is small enough, and if the electrical power generator 104 is correctly designed, such a system may draw 20 watts or more of power from a person moving at a comfortable speed, without the use of gears. In some embodiments, the capstan varies in size from 6 to 10 millimeters in diameter. Eliminating gears results in quieter, smoother, and more efficient operation, as compared with a geared design.

In one embodiment of the Erg configuration, mechanical power is drawn from the capstan when the string is being pulled; not when it is retracting. This dictates decoupling the capstan from the electrical power generator 104 during retraction. This can be done using a one-way friction clutch, such as a "roller clutch" based on needle bearings.

One drawback to the inclusion of a clutch is increased package size. This can be overcome by situating the clutch inside the electrical power generator 104. In some embodiments the electrical power generator 104 is of large diameter, such that there exists ample space inside for inclusion of a clutch. Inclusion of the clutch reduces the stacking height of the overall drive axis of the system.

The electrical power generator 104 uses rectifier 106 to convert an electrical alternating current ("AC") output to a direct current ("DC") output. The controller monitors characteristics of the generator or its output over time to improve performance. For example, the cycle frequency, or revolutions per minute ("RPM") of the electrical power generator is typically monitored and stored. Examples of information stored in the memory 112 include:

the previous and current loading;
the previous and current average power;
the previous and current total energy; and
the elapsed time since the last generation cycle.

An electrical power generator 104 may be modeled by a speed-controlled voltage source, in series with a Thevenin resistance. The voltage of the source is linearly proportional to the shaft speed of the electrical power generator 104. Therefore, the maximum power that may be drawn from the electrical power generator 104 is proportional to the square of the shaft speed:

$$V\_oc = k * omega$$

$$P\_max = \frac{1}{2} V\_oc * \frac{1}{2} I\_sc$$

$$I\_sc = V\_oc / R\_thevenin$$

Therefore, $P\_max = V\_oc^2/(4*R\_thevenin) = k^2 * omega^2/(4*R\_thevenin)$. It may be shown that the maximum power point for any particular shaft speed is at half the open-circuit voltage, and half the short-circuit current.

If a small radius generator is used, the magnet mass that can be effectively used is small. This means the amount of energy absorbed per rotation is also small. A problem is that this dictates low power outputs for reasonable shaft rotation speeds. In other words, a small radius results in a small value of k, above. To couple the electrical power generator 104 effectively to human body motions without the use of gears, a electrical power generator 104 must be chosen which has large enough k. Since k varies as the physical volume of the electrical power generator 104, this condition dictates, for a given magnet quality, a minimum physical volume for the electrical power generator 104.

In designing an electrical power generator 104 with large physical volume, one may choose to make it axially long, radially fat, or both. But while volume is proportional to $r^2*length$, the area of magnets required is proportional to only $r*length$. In order to make economic use of magnets, it is advantageous to maximize r. In some embodiments, short, fat generators, are thus chosen typically with a diameter to length ratio of between 4 and 6, although other ratios can also be used.

Once the armature shape of the electrical power generator 104 is chosen, a wire diameter is selected for the windings to match the output voltage at a humanly realizable speed, to the voltage of the batteries being charged, or the desired input voltage of the equipment to be run. Throughout this specification, this speed is called the "cut in" speed.

In order to be able to modulate the coupling electronically, the cut-in speed should be lower than the average expected use speed, called "design speed" throughout this specification. In some embodiments, the cut-in speed is chosen to be about one third the design speed.

The electrical output of the electrical power generator 104 must be coupled to the load. This involves three steps: Rectification of the electrical power generator 104 output; Optional up or down-conversion of the voltage; and Optional pulse-width-modulated switching of the output voltage onto the load.

The most direct coupling available is a rectifier stage driving the load directly. This is not desirable, since above the cut-in speed, the torque required from the user increases sharply, and is not adjustable: It is fixed by the design of the electrical power generator 104.

In some embodiments, to allow adjustable torque output without wasting any energy, a Pulse Width Modulation ("PWM") is employed to rapidly connect and disconnect the electrical power generator 104 from the load, thereby varying the effective torque load presented to the user. By varying the duty cycle of the PWM signal, the effective torque presented to the user can be adjusted, at any speed above the cut-in speed.

The winding wire in the electrical power generator 104 is chosen such that the cut-in speed is somewhat lower than the design speed. The cut-in speed is typically chosen to be less than half of the design speed. This gives a reasonably wide range of torques available at the design speed.

In some embodiments, controller and memory 112 uses PWM therefore to modulate control gate 108. The controller and memory 112 may monitor, for example, the cycle frequency, or revolutions per minute ("RPM") of the electrical power generator 104, to adjust the coupling of the mechanical power source through the electrical power generator 104 to the electrical load.

The controller and monitor 112 may also drive an optional user feedback device 114. In some embodiments, provisions may be made in 114 for feeding back some information to the user using visual, audible, or tactile cues.

Visual cueing may be accomplished by one or more light emitting diodes ("LEDs") fitted to the device, and under control of the controller 112. By pulse-width-modulating the LED drive, differing apparent brightnesses may be achieved or other visual cues may be provided.

Audible cueing may be accomplished actively, by use of a dedicated audio output device, such as a piezoelectric speaker or buzzer element. Alternative, and with lower cost, audible cueing may be accomplished "semi-passively" while the unit is being driven by the user, by modulating the load power at an audio frequency (say, for instance, 200 Hz to 2000 Hz). This will superimpose a "tonality" onto the sound of the electrical power generator 104, by causing it to vibrate microphonically at the modulation frequency.

Tactile cueing may be accomplished while the unit is being driven by the user, by modulating the load power at a tactile frequency (say, 2 Hz to 10 Hz). This will produce a "vibrating" feel in the torque feedback being presented to the user, and the user will be able to feel this vibrational feedback.

If it is desired to suggest a particular pacing interval, the user may be alerted to this suggested pacing interval by any of several visual or auditory methods. It may be done visually by pulsing or flashing a LED on and off at the suggested pace or by providing a display with a value representing the power or rotation, for example, and a second display (or using the same display at a different time) with the optimal power or rotation value, for example. Such pulsing may be pure on and off, or it may be a "throbbing" mode using PWM of the LED drive. To suggest a pace audibly, a speaker or buzzer element must be used, since the user may not be powering the device during the time the controller 112 wishes to produce the audible cue.

The output electrical power level might be best presented to the user through the use of a single PWM LED which glows at a "brightness" proportional to the delivered power level, or through the use of multiple LED's used in a "bar graph" type configuration. The output electrical power level could also be presented audibly, by using a variably pitched tone, the pitch of which is related to the power level. Such tone could be presented by either the active method, using a speaker or a peizo element, or semi-passively.

An "over-power condition", defined throughout this specification as the situation when the user is delivering too much power for the device to convert without damaging itself or the load, could be indicated by methods including: Visually, using an LED. The LED could if desired be pulsed at about 3 Hz for maximum visibility; Audibly, using either the active or semi-passive methods; and Tactilely, by causing the device to vibrate, "fight back" (go to higher loading), or "break free" (go to lower loading), or any combination of these.

If the user is not reaching the cut-in speed, an "under-power condition" is occurring. This obviously cannot be indicated by any semi-active method, since the device is not delivering power, but any of the active methods (audible or visual) may be used.

Figure 1B:
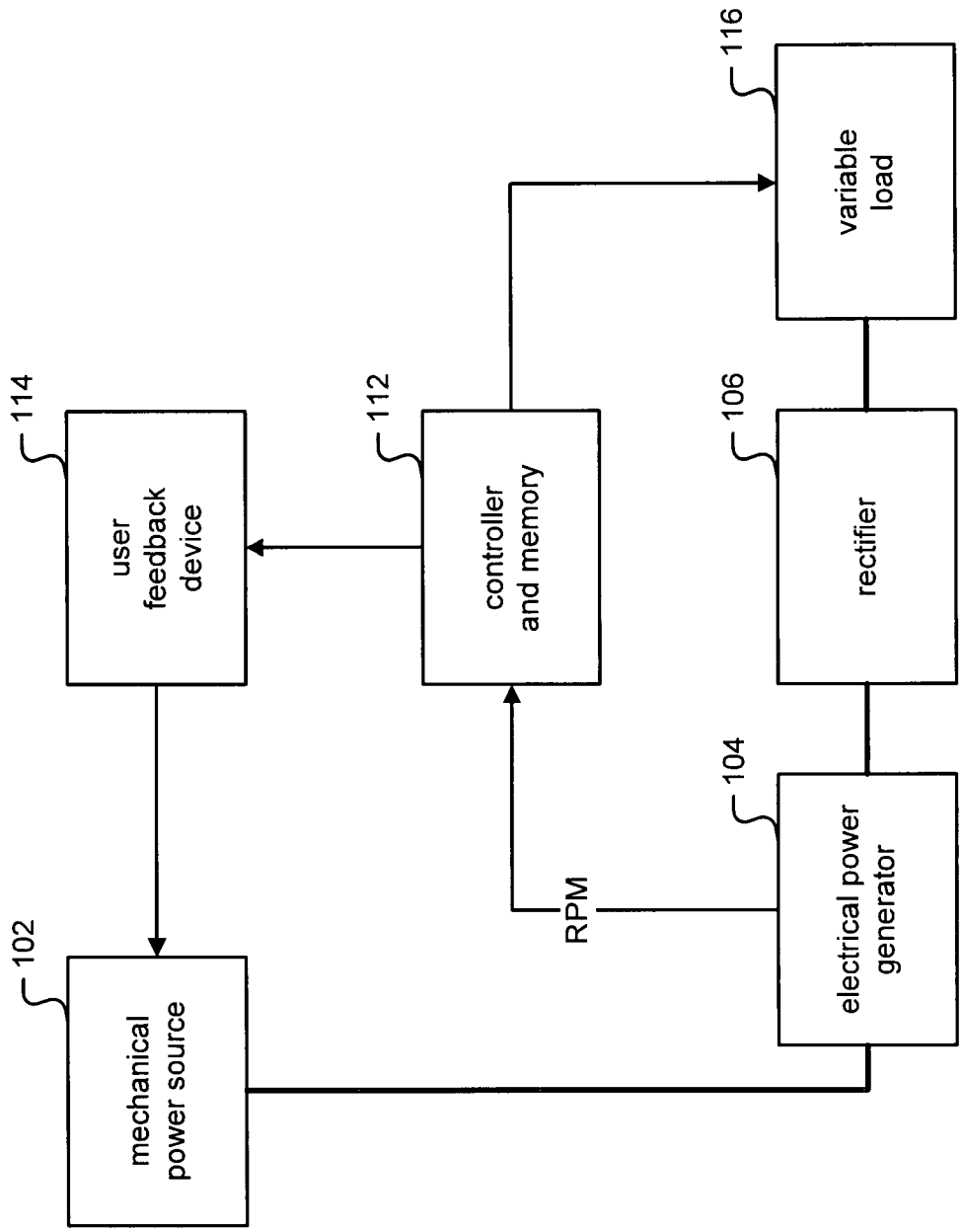
FIG. 1B is a block diagram illustrating a second embodiment of a power generator.

FIG. 1B is a block diagram illustrating a second embodiment of a power generator. In the example shown, mechanical power source 102 is connected through electrical power generator 104, through rectifier 106 to a variable load 116. A controller and memory 112 takes input from electrical power generator 104 and provides controls for varying the variable load 116. The controller and memory 112 optionally provide an output to a user feedback device 114 which is sent back to the mechanical power source 102.

The difference between the system presented in FIG. 1B and the system presented in FIG. 1A is the variable load 116. The variable load 116 interfaces with controller and memory 112.

Figure 1C:
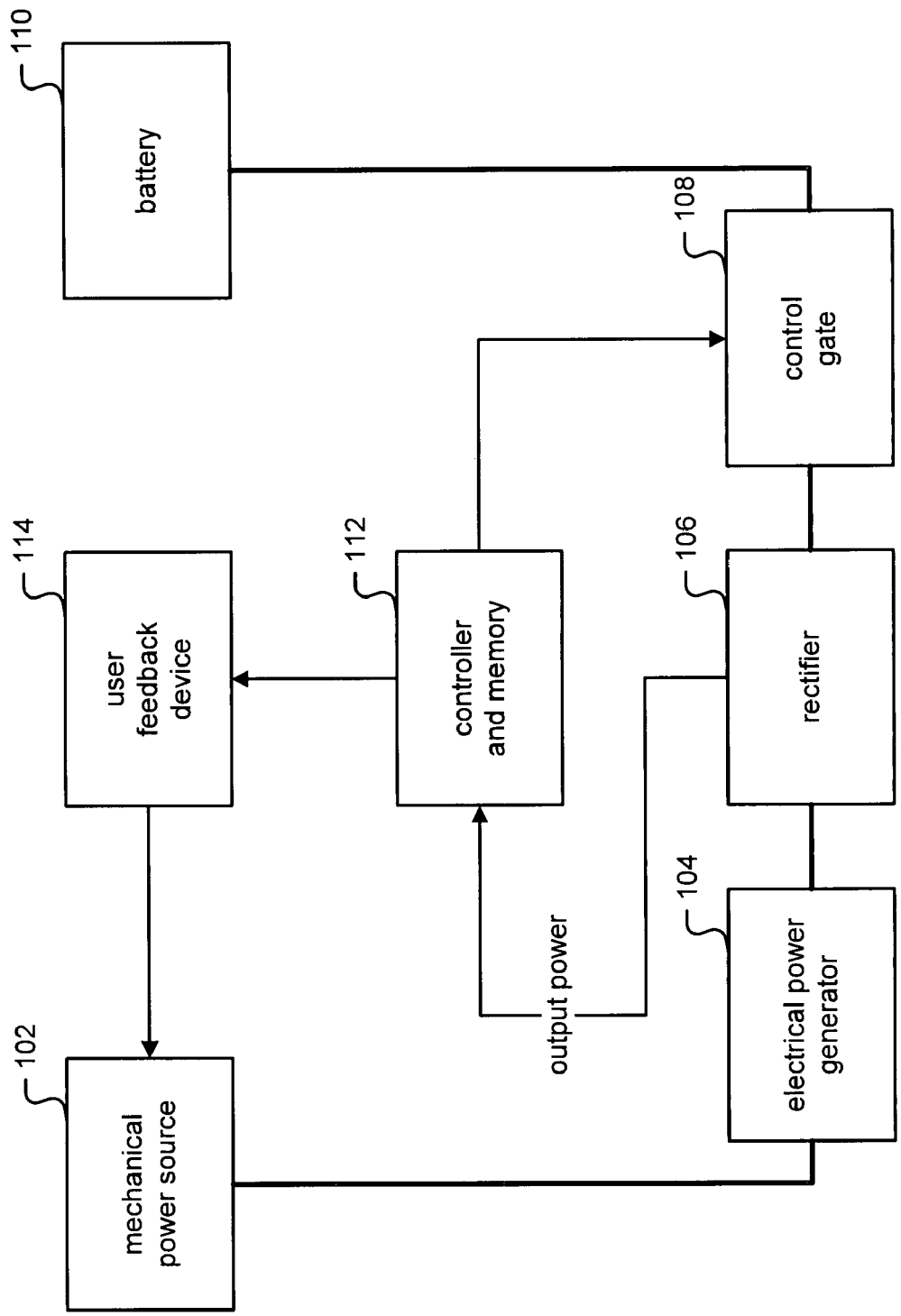
FIG. 1C is a block diagram illustrating a third embodiment of a system for coupling a mechanical power source through an electrical power generator to an electrical load.

FIG. 1C is a block diagram illustrating a third embodiment of a system for coupling a mechanical power source through an electrical power generator to an electrical load. In the example shown, mechanical power source 102 is connected through electrical power generator 104, through rectifier 106 to a variable load 116. A controller and memory 112 takes input from rectifier 106 and provides controls for varying the variable load 116. The controller and memory 112 optionally provide an output to a user feedback device 114 which is sent back to the mechanical power source 102.

The difference between the system presented in FIG. 1C and the system presented in FIG. 1A is that the controller and memory 112 takes input from rectifier 106 directly as output power in FIG. 1C, rather than from a sensor that measures a characteristic such as cycle frequency in FIG. 1A.

Figure 2A:
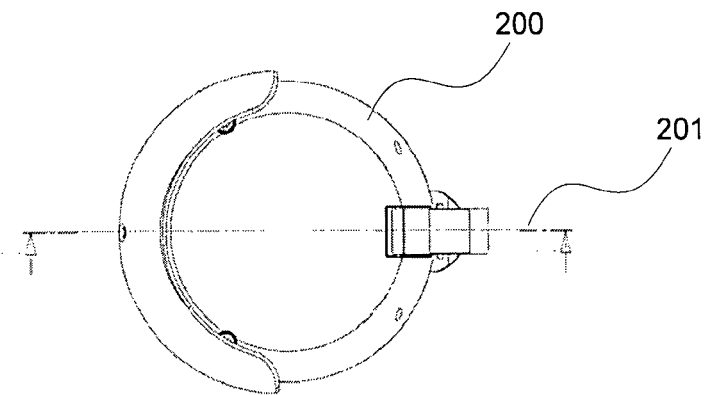
FIGS. 2A and 2B are diagrams illustrating embodiments of the system for coupling a mechanical power source through an electrical power generator to an electrical load.
Figure 2B:
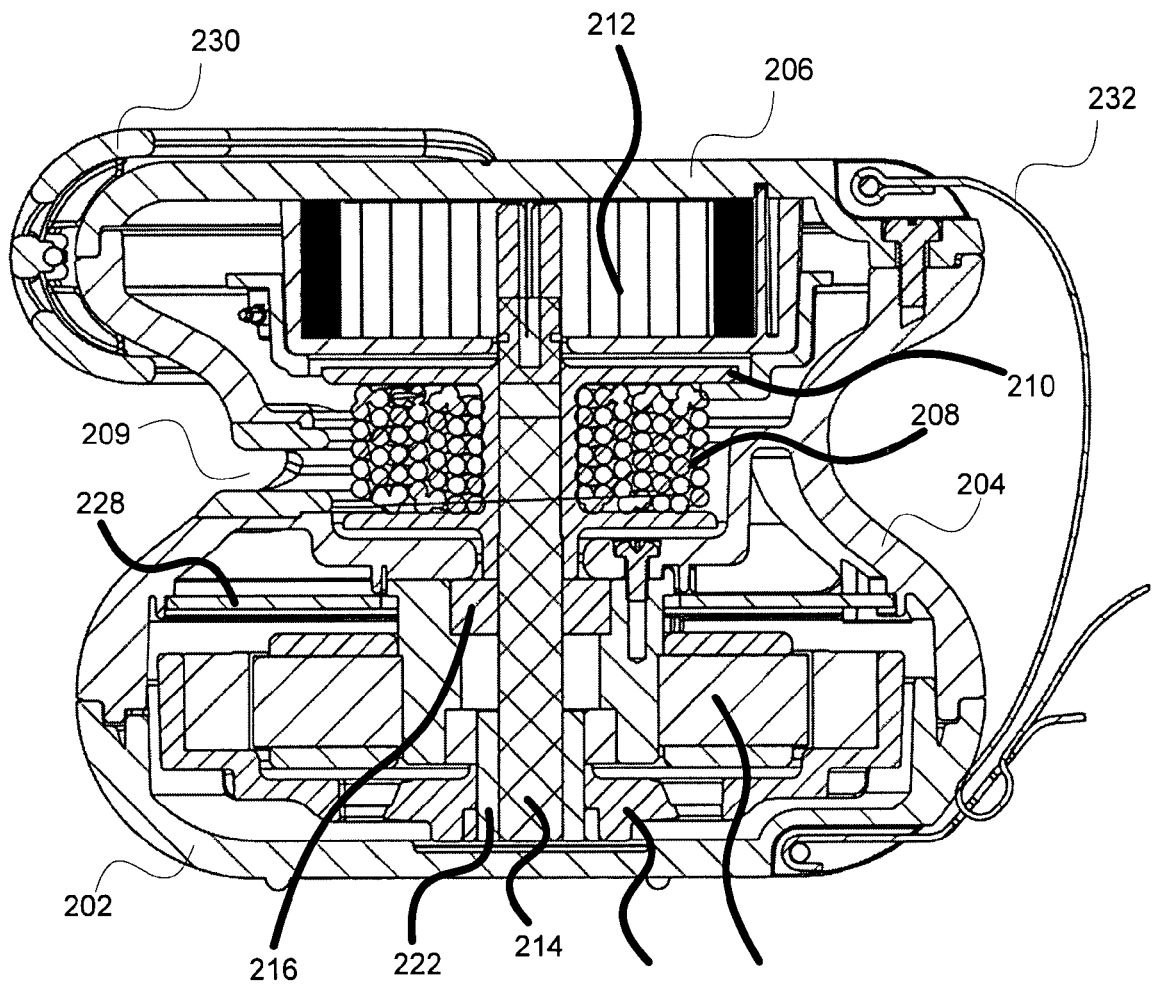

FIGS. 2A and 2B are diagrams illustrating embodiments of the system for coupling a mechanical power source through an electrical power generator to an electrical load. In the example shown in FIG. 2A, power generating unit 200 is shown in a top view with a line 201 indicating a cut view line for FIG. 2B. In the example shown in FIG. 2B, power generating unit includes bottom of case 202, middle hour glass of case 204, top of case 206. String 208 is wrapped around the center of bobbin 210. String 208 is secured to bobbin 210 at one end. The other end of string 208 passes out a fairlead hole 209. The other end of string 208 is attached to a handle that enables a user to pull string 208, unwinding string 208 from bobbin 210. Bobbin 210 rotates while string 208 unwinds. Once unwound, string 208 is rewound around bobbin 210 by turning bobbin 210 using spring 212. The outer end of spring 212 is coupled to a housing that is in turn coupled to top of case 206 (not shown in FIG. 2B). The inner end of spring 212 is couple to bobbin 210 (not shown in FIG. 2B). On unwinding of string 208, bobbin 210 compresses energy into spring 212. The compressed energy in spring 212 is used to rewind string 208 around bobbin 210.

In some embodiments, spring 212 is not included in power generating unit 200 (e.g., a motor is used to rewind string 208 on bobbin 210 or a second string on bobbin 210 is used to rewind a first string such as string 208).

On unwinding of string 208, bobbin 210 rotates and turns shaft 214. Shaft 214 is coupled to bobbin 210 by having a keyed hole in bobbin 210 into which a corresponding keyed shaft 214 mates. In various embodiments, the keyed hole comprises a "D" shaped hole, a star shaped hole, a square hole, a hexagonal hole, a single flat, a dual flat, splined, or any other appropriate keyed hole enabling a rotation of bobbin 210 to be transmitted to shaft 214. Shaft 214 is coupled to sealing bearing 216. Sealing bearing 216 seals the lower chamber from the upper chamber. The upper chamber can be opened by opening top of case 206 and separating top of case 206 from middle hour glass of case 204. Opening the upper chamber allows access to the keyed end of shaft 214, bobbin 210, string 208, and spring 212. The lower chamber is sealed to prevent environmental contamination from affecting the electronic components in the lower chamber.

The lower chamber contents include clutch 222, rotor 224, stator 226, and circuit board 228. Clutch 222 couples shaft 214 to rotor 224. Clutch 222 enables a rotation of bobbin 210 to be transmitted to rotor 224 when string 208 is being unwound (e.g., as a user pulls string 208). Rotor 224 rotates with a ratio of 1:1 with a rotation of bobbin 210. Clutch 222 does not enable a rotation of bobbin 210 to be transmitted to rotor 224 when string 208 is being rewound (e.g., as string 208 is rewound on bobbin using, for example, a spring force).

Rotor 224 includes magnets (not indicated in FIG. 2B). In some embodiments, rotor 224 includes an inertial mass (not indicated in FIG. 2B). Stator 226 includes wire windings in which the current is generated from the motion of bobbin 210 and rotor 224.

Handle 230 detaches from the top of the hour glass case and is attached to one end of string 208 after passing out fairlead hole 209. Handle 230 can be pulled by a user to cause rotation of bobbin 210. Strap 232 can be used to anchor the power generating unit to a fixed object. A user can then pull on handle 230 without holding the case of the power generating unit. A user fatigues less quickly if only pulling on handle 230 and not also providing an anchoring force for the case than if pulling and anchoring.

Figure 3A:
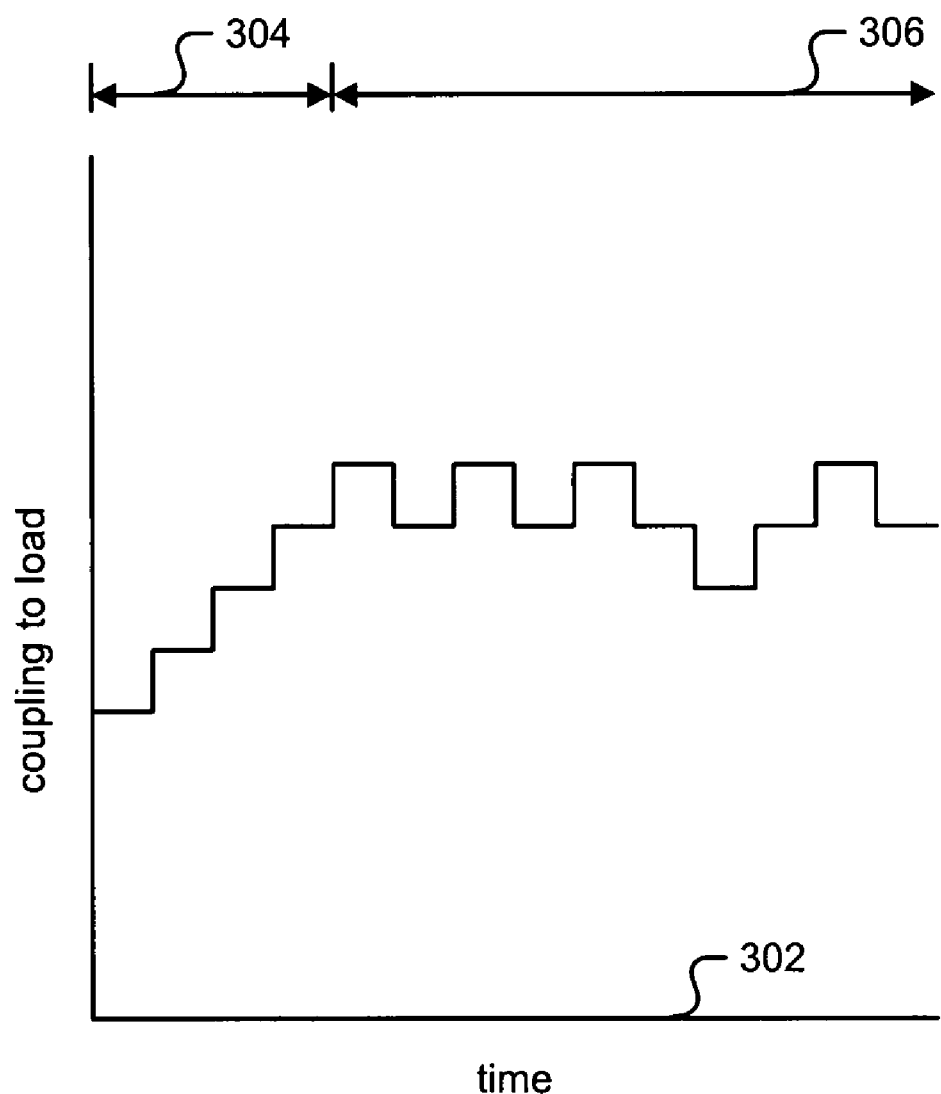
FIG. 3A is a diagram of an example controller output.

FIG. 3A is a diagram of an example controller output. Graph 302 shows that as time progresses the coupling to the load changes along discrete time steps. Each discrete time step represents a single generation cycle. The controller output changes the coupling to the load, for example, by switching control gate 108 or variable load 116 according to a PWM duty cycle.

In time segment 304, the coupling to the load increases after each generation cycle until it reaches a level completing the adjustment. In time segment 306, the coupling to the load continues to change after each generation cycle but dithers around a steady state level.

Figure 3B:
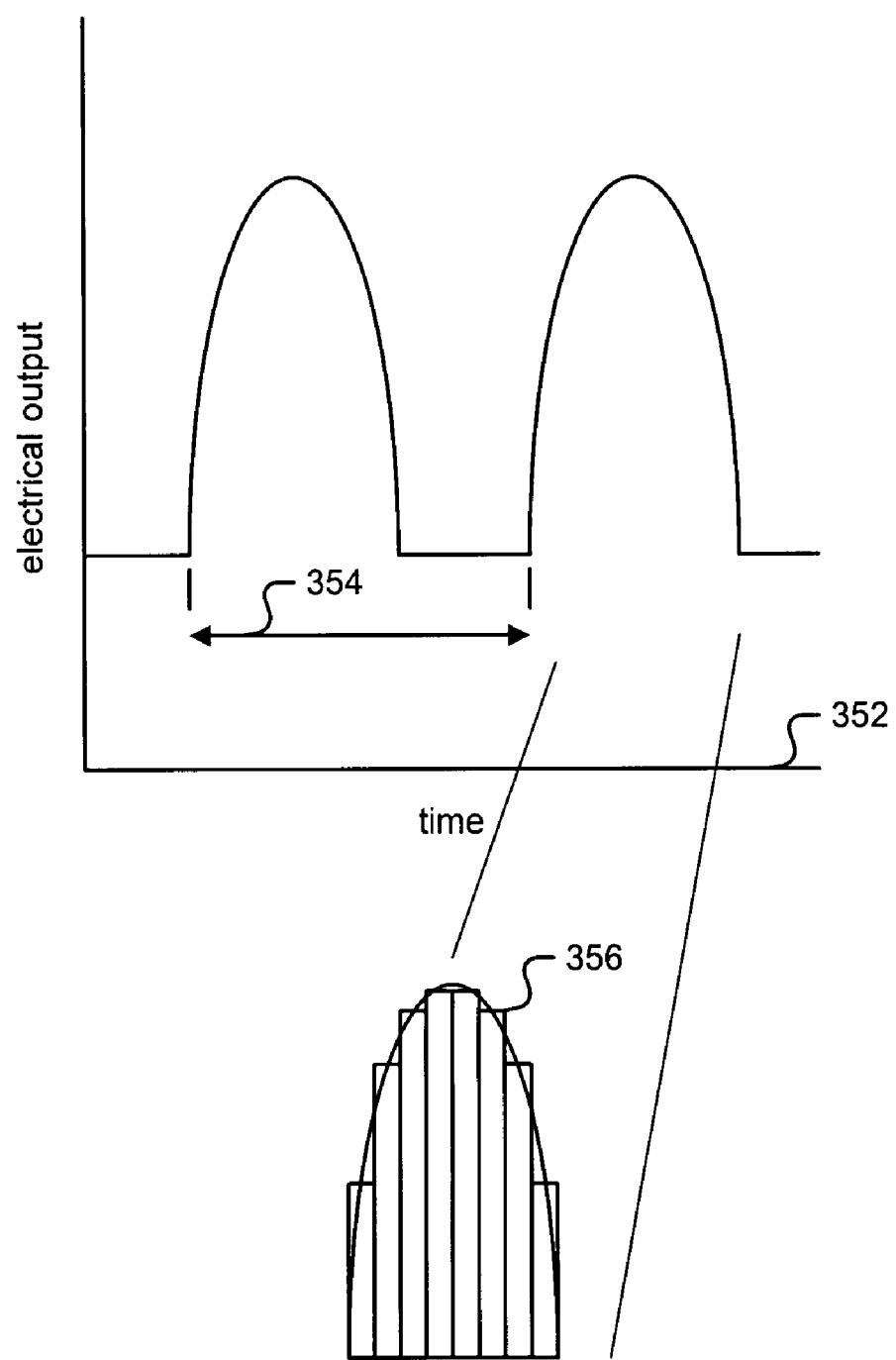
FIG. 3B is a diagram of an example generator output that is input to the controller.

FIG. 3B is a diagram of an example generator output that is input to the controller. Graph 352 shows that as time progresses electrical output is produced during each generation cycle. The control signal output from the controller is determined by various characteristics of the electrical output. For example, the total energy of a cycle can be used to determine whether to increase or decrease the coupling to the load. Likewise, the period 354 or frequency of the generation cycle or the average power of the generation cycle can be used to determine how to change the coupling to the load. In addition, trends in the period, total power, or total energy over a number of cycles may also be used. In general, any characteristic of the generator output power may be used to determine how to adjust the load coupling according to any appropriate scheme. In one simple scheme, a random walk algorithm is used to search for a coupling that results in maximum average power over time. Other goals may be set based on knowledge of how a human or animal may fatigue over time so that a lower power is achieved over a longer period, or to maximize human or animal comfort. In some embodiments, certain schemes analyze the power produced during different portions of a single cycle to improve power output or ergonomics for the user, (for example reducing the effective load during the start of a cycle to make it easier for the user to get "up to speed" during a pull.) In some embodiments, more than one optimization scheme may be made available for a user to select.

The adaptive loading schemes vary the effective average electrical impedance of the load being presented to the electrical power generator 104. This produces a variable resistance to the user, so it is "easier" or "harder" to operate the device at a given speed without wasting power. By controlling the mechanical resistance, the device is configured to extract power from the user in an efficient manner. This can be analogized as "switching gears" on a bicycle: Different people may obtain their best power output over a longer or shorter time by pedaling at different speeds in a higher or lower gear. Controller 112 implements a control scheme that achieves a desired power output for a given user. Various control schemes are used. For example, the controller can implement preprogrammed load profiles over time or it can execute an adaptive loading algorithm to draw the maximum effective power from the human or animal operating the mechanical drive mechanism.

For each user operating at a specified "effort level", there is some value of mechanical impedance which draws the most mechanical power from the user. The PWM electrical coupling method and the switching converter methods of coupling discussed above can both approach 100 percent efficiency if properly designed, so the point of maximum power draw from the user is also the point of maximum power transfer to the electrical load.

Some embodiments optimize power transfer to the load by automatically manipulating the coupling, and finding the impedance point at which maximum average power is transferred to the load. This adaptive loading occurs transparently in the background, with no conscious input from the user.

In order to be able to find this maximum power point, some method of measuring power transfer is provided to the microprocessor. Such methods are discussed below.

A mechanism may be provided for the microprocessor to measure instantaneous power to the load, by measuring the voltage across the load and the current through the load. This can be accomplished with a small current sensing (series shunt) resistor and two analog to digital converters.

By virtue of being able to read the voltage drop across the current sensing resistor and the voltage drop across the load, the microprocessor can determine the instantaneous rate at which power is being transferred to the electrical load. Also, by varying the duty cycle of the switching converter or of the PWM switch, the microprocessor can vary the average power being transferred to the load.

If a fixed voltage load is employed, such as a battery with a relatively flat charging curve, then measuring power transfer becomes slightly easier: The load voltage, being fixed, need no longer be measured—only current must be measured. This can be done using the same series shunt resistor as discussed above. However, this still uses an analog to digital converter, which increases cost.

A method for implicitly measuring the current without the series shunt resistor and without the analog to digital converter, if the electrical power generator 104 characteristics (k, R_thevenin) are known is also used. The open-circuit generator voltage is proportional to shaft speed:

$$V\_oc = k*\text{omega}$$

If a mechanism for measuring the shaft speed is available (for instance, a hall-effect sensor detecting the rotor magnets of the electrical power generator 104), and if k is known, then V_oc can be computed by multiplying these two together.

Moreover, if the electrical power generator 104 is driving into a fixed voltage load of known voltage V_load, then current into the load can be computed using the Thevenin equivalent circuit of the motor. The current is thus given by:

$$I = (V\_oc - V\_load)/R\_thevenin$$

Therefore the instantaneous power delivered to the load is computed as:

$$P = V\_load*I = V\_load*(k*\text{omega} - V\_load)/R\_thevenin$$

Note that V_load is known, k is known, and R_thevenin is known. So the power being delivered to the load may be implicitly measured by measuring only the shaft speed omega.

The expression for implicit power measurement may be rewritten as follows:

$$P = C*(\text{omega} - \text{omega}\_0)$$

Where the two constants C and omega_0 are given by:

$$C = V\_load*k/R\_thevenin$$

$$\text{Omega}\_0 = V\_load/k$$

Here, omega_0 is the cut-in speed. By precomputing omega_0 only once, and installing it as a constant in the controller 112 firmware, the computational load on the controller 112 to compute the power can be substantially reduced. In some embodiments, the constant C can be dropped if absolute units of power is not necessary, for example the case of maximum power loading in one embodiment.

The simplified expression for implicit power measurement is thus given by:

$$P' = \text{omega} - \text{omega}\_0$$

Thus, for an electrical power generator 104 of known characteristics supplying power to a load of known fixed voltage, the instantaneous power can be implicitly measured by simply subtracting the cut-in speed from the current speed of the motor.

In the absence of known electrical power generator 104 characteristics, a value for omega_0 can be arrived at simply by measuring it. One method is to drive the electrical power generator 104 with a variable speed motor into the fixed voltage load, and measure the current delivered to the load. The cut-in speed is the speed at which the current delivered to the load rises above zero.

When designing the electrical power generator 104, the question arises as to what the range of shaft speeds are expected during use. Since different people operate the device most comfortably at different speeds, some range must be provided over which the device can usefully operate.

To accommodate drawing power from users with slow speeds, a small cut-in speed is desired. However, obtaining a lower cut-in speed necessitates a larger generator. Thus a compromise is dictated. In some embodiments, the average use speed or design speed is estimated and a cut-in speed which is ⅓ to ½ of the design speed is chosen.

Once the cut-in speed is chosen and the electrical power generator 104 armature is designed, the electrical power generator 104 winding wire size is chosen so as to match the electrical power generator 104 output voltage to the load voltage, at the chosen cut-in speed.

Since the electrical power generator 104's connection to the load is being switched via the PWM coupling circuit, the average power delivered during one PWM cycle is less than the instantaneous power during the "on" portion of the PWM cycle.

Also, since in many of the embodiments, the electrical power generator 104 is not running at a uniform shaft speed, even this average power delivered to the load is not constant over time periods much longer than a PWM cycle. For instance, in the Erg configuration, the duration of the retraction phase may be equal to the duration of the pull. Thus, over a period of several seconds or longer, power is only being delivered to the load approximately half the time.

In the case of the PWM problem: The average power being delivered over a period of one or more PWM cycles is simply the instantaneous power, multiplied by the PWM duty cycle:

$$P\_bar = P'*d = (omega - omega\_0)*d$$

Where d is the fractional duty cycle of the PWM modulation.

Subdiagram 356 shows a method of integrating the area under the electrical output using a rectangular approximation. In some embodiments including the systems shown in FIG. 1C, the area under the electrical output is used to estimate or measure the average power from the input to controller and memory 112.

To compute the average power over long periods, it is helpful to be able to measure the pacing which the user is applying to the device. If implicit power measurement is used, the controller 112 already has a measurement of the shaft speed available, so it is possible to determine the beginning and end of the pacing cycle.

In one embodiment the pacing cycle time is defined by the interval during which the shaft speed stays continuously above the cut-in speed (the "pull" interval), plus the interval during which the shaft speed stays continuously below the cut-in speed (the "retract" interval). The sum of the pull interval and the retract interval gives the "pace" interval.

The average power over each pace interval can be computed by integrating the average power delivered during each PWM cycle, over the time of an entire pace interval, and then dividing by the length of the pace interval:

$$P\_bar' = integral(P\_bar)/T\_pace$$

Where T_pace denotes the pace interval.

The integral can be approximated with a finite sum over small time intervals delta_T:

$$P\_bar' = sum(P\_bar*delta\_T)/T\_pace$$

Again, if the units of power are unimportant, the constants may be dropped:

$$P\_bar'' = sum(d*(omega-omega\_0))/N$$

Where N denotes the number of delta_T time intervals in the pace interval.

Now finally, if d is held constant during an entire pace interval, then it factors out of the sum:

$$P\_bar'' = d/N*sum(omega-omega\_0)$$

In this way, the computational load on the controller 112 is reduced to compute the average power over a pace interval to a single addition and subtraction per delta_T, plus a single multiplication and division per pace interval.

Figure 4:
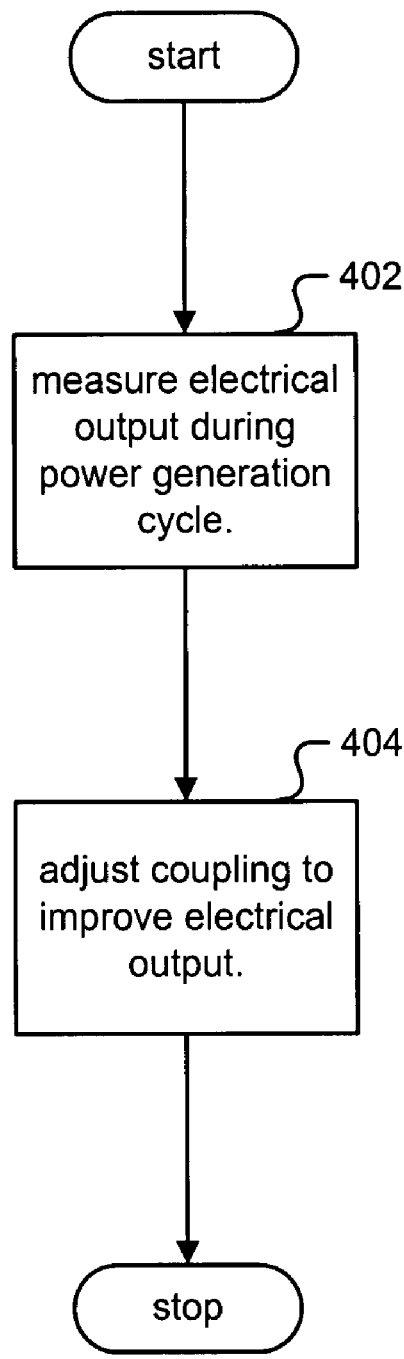
FIG. 4 is a flowchart illustrating a method for coupling a mechanical power source through an electrical power generator to an electrical load.

FIG. 4 is a flowchart illustrating a method for coupling a mechanical power source through an electrical power generator to an electrical load. The process may be implemented in controller and memory 112. In various embodiments, these steps may be omitted or performed in a different order.

In step 402, the electrical output of the electrical power generator 104 is measured directly or indirectly by controller and memory 112 during a single power generation cycle 354 during which there is a coupling of the mechanical power source through the electrical power generator to the electrical load as discussed with FIG. 3B.

In step 404, the controller and memory 112 adjust the coupling of the mechanical power source through the electrical power generator 104 to the electrical load during a subsequent power generation cycle based at least in part on the measured characteristic of the electrical output.

Figure 5:
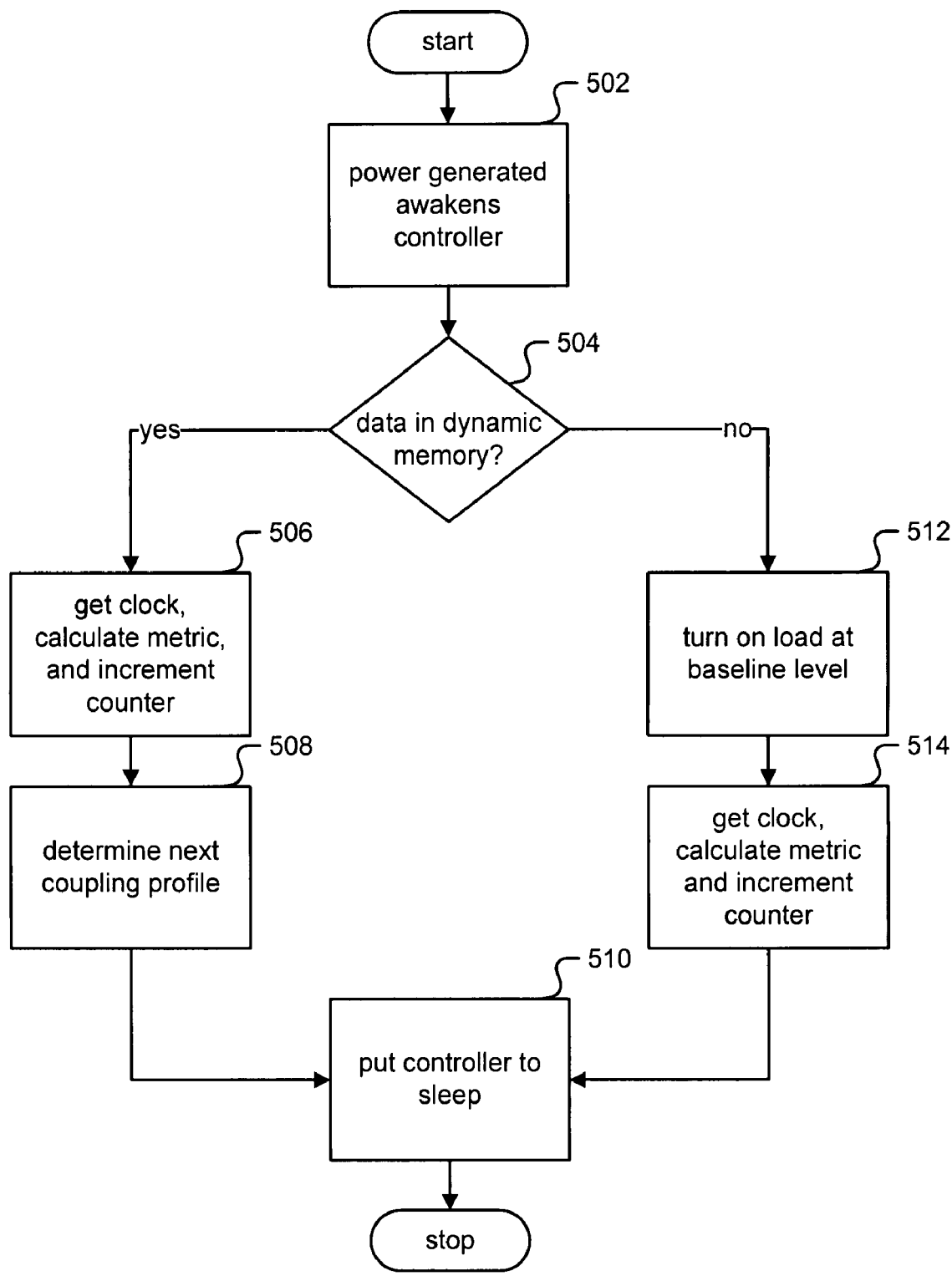
FIG. 5 is a flowchart illustrating a method for powering the controller from the electrical power generator.

FIG. 5 is a flowchart illustrating a method for powering the controller from the electrical power generator. In some embodiments the controller and memory 112 are powered from the electrical power generator 104. The process may be implemented in controller and memory 112. In various embodiments, these steps may be omitted or performed in a different order.

In step 502, the electrical power generator 104 has completed a generation cycle 354, and this power awakens the controller and memory 112. If it is determined in step 504 that there is data in dynamic memory 112, then control is transferred to step 506; otherwise, control is transferred to step 512.

In step 506, because data is set in dynamic memory 112, the controller 112 determines that the electrical power generator is in the middle of coupling a mechanical power source through an electrical power generator to an electrical load. A clock is recorded, one or more metrics are calculated from one or more measurements of electrical output, and one or more counters are incremented.

In step 508, the controller and memory 112 determines the next coupling profile. In step 510 the controller and memory 112 are put back to sleep for the next generation cycle.

In step 512, because data is clear in dynamic memory 112, the controller 112 determines that the electrical power generator is initiating a new coupling of a mechanical power source through an electrical power generator to an electrical load with no previous information. The load is turned on to a baseline level using the controller output, and in some embodiments the output is a PWM loading duty cycle. In step 514, a clock is recorded, one or more metrics are calculated from one or more measurements of electrical output, and one or more counters are incremented.

Figure 6A:
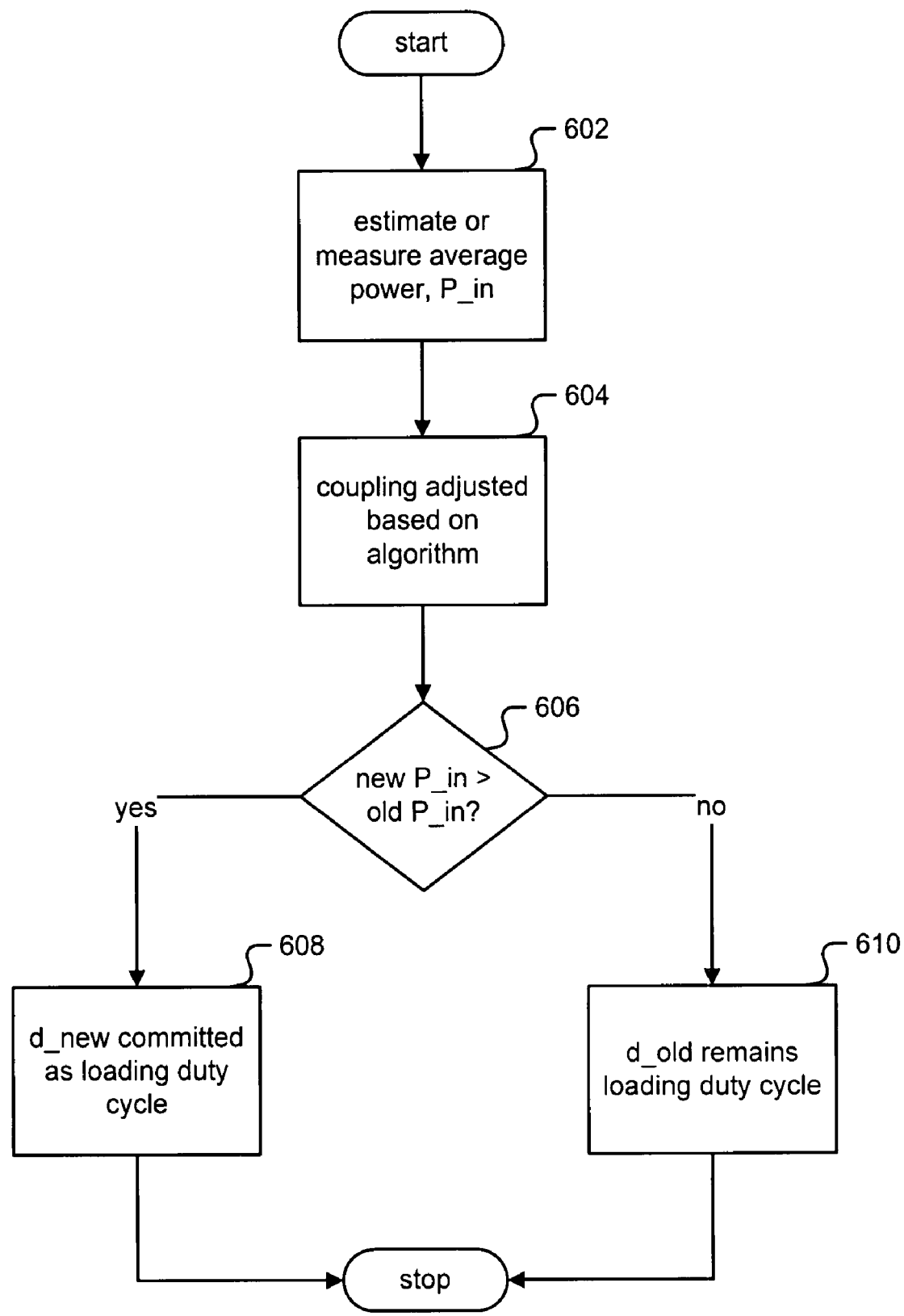
FIG. 6A is a flowchart illustrating a method for adjusting the coupling of the mechanical power source through the electrical power generator to the electrical load to increase the average output power of the electrical power generator attainable by the mechanical power source at a given level of effort.

FIG. 6A is a flowchart illustrating a method for adjusting the coupling of the mechanical power source through the electrical power generator to the electrical load to increase the average output power of the electrical power generator attainable by the mechanical power source at a given level of effort. In some embodiments, the process of FIG. 6A is included in 404 of FIG. 4. The process may be implemented in controller and memory 112. In various embodiments, these steps may be omitted or performed in a different order.

In step 602, the input signal to controller and memory 112 is processed to estimate or measure the average power from the electrical power generator 104 in FIGS. 1A and 1B or from rectifier 106 in FIG. 1C. In step 604, the coupling is adjusted based on an algorithm. In some embodiments, a two-point random walk adaptive loading algorithm is used.

Two-point random walk adaptive loading algorithm. A sophisticated adaptive loading algorithm uses a randomized algorithm that uses a random walk to "drift" toward the user's maximum power point. This takes advantage of the fact that a random walk whose probability is biased toward the uphill direction on a smooth, convex optimality curve, will converge to a probability distribution centered around the optimum point on that curve. The algorithm operates as follows:

1 Start with an initial loading duty cycle, d_old.
2 Run an entire pacing interval at d_old.
3 Now, randomly or pseudo-randomly step d either up or down by a small amount delta to arrive at d_new=d_old+/−delta.
4 Run another pacing interval at d_new.
5 If it is determined at step 606 that the average power at d_new is greater than that at d_old, then control is transferred to step 608; otherwise, control is transferred to step 610. In step 608, d_new is committed as the loading duty cycle and replaces d_old. In step 610, d_old remains the loading duty cycle.

Two other algorithms are disclosed: a three-point adaptive loading algorithm and a two-point flip-flop adaptive loading algorithm.

Three-point adaptive loading algorithm. In one embodiment, the adaptive loading algorithm operates as follows to determine the user's optimum power output level:

1 The system operates the converter at three distinct, but closely-spaced load levels, each for some period of time. In some embodiments a different number of load levels can be used. The load levels are closely enough spaced that the human or animal need not be aware that the load is being varied. However, the slight variations in load will cause slightly different amounts of power to be transferred to the electrical load.
2 The algorithm measures these three amounts of power at the three different load levels. If the middle-most load generates the largest power reading, the average load is kept at the same level for the next cycle of the algorithm.
3 If, however, the maximum power is transferred at the highest load level, the algorithm infers that the power transferred could be increased by raising the load level. This occurs, for example, when the mechanical input stage is too lightly loaded, so the device is too "easy" to operate: The adaptive load algorithm will detect that the human or animal is neither tired nor fatigued, and will raise the loading to draw more power from the human or animal.
4 Conversely, if the maximum power is transferred at the lowest load level of the three trial levels, the algorithm infers that the power transferred could be increased by lowering the load level. This occurs, for example, when the human or animal powering the mechanical input stage begins to tire: A lighter loading may allow the human or animal to drive the mechanical input stage faster at a lighter load, thereby generating more power overall.
5 Once the decision has been made that the loading is correct, or too low, or too high, the center load is adjusted appropriately, and the algorithm returns to step 1, above.

Two-point flip-flop adaptive loading algorithm. A computationally more efficient algorithm that does not require a random number generator is inspired by the realization that randomization is not needed at step 3 in the two-point random walk adaptive loading algorithm. This simplified algorithm simply takes steps in alternating directions:

1 Start with an initial loading duty cycle, d_old.
2 Run an entire pacing interval at d_old.
3 Step d up by a small amount delta to arrive at d_new=d_old+delta.
4 Run another pacing interval at d_new.
5 If the average power at d_new is greater than that at d_old, replace d_old by d_new.
6 Step d down by a small amount delta to arrive at d_new=d_old−delta.
7 Run another pacing interval at d_new.
8 If the average power at d_new is greater than that at d_old, replace d_old by d_new.

Figure 6B:
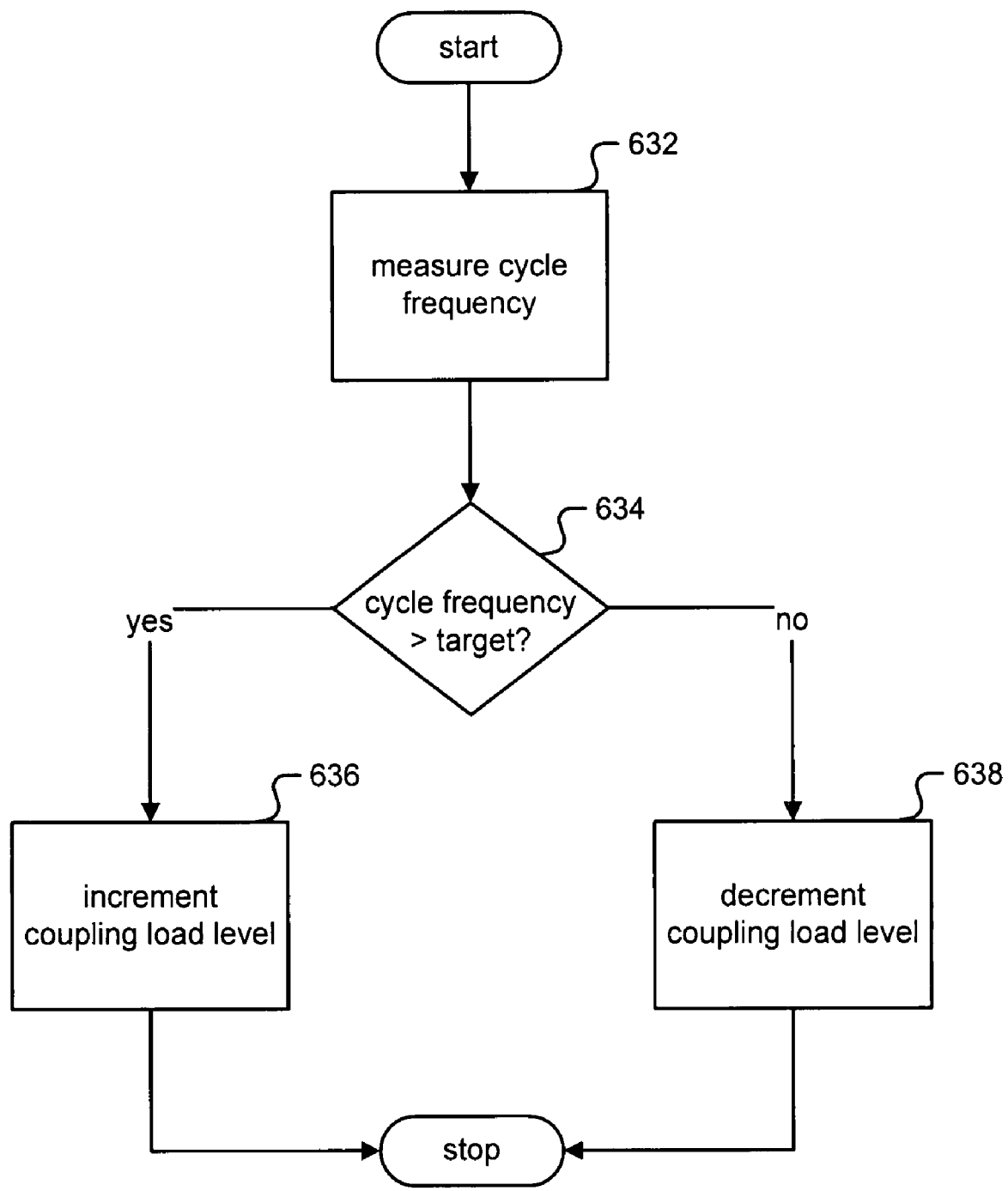
FIG. 6B is a flowchart illustrating a method for adjusting the coupling of the mechanical power source through the electrical power generator to the electrical load to target maintaining a desired cycle frequency of the electrical power generator.

FIG. 6B is a flowchart illustrating a method for adjusting the coupling of the mechanical power source through the electrical power generator to the electrical load to target maintaining a desired cycle frequency of the electrical power generator. In some embodiments, the process of FIG. 6B is included in 404 of FIG. 4. The process may by implemented in controller and memory 112. In various embodiments, these steps may be omitted or performed in a different order.

In step 632, the input signal to controller and memory 112 is processed to estimate or measure cycle frequency 354 from the electrical power generator 104 in FIGS. 1A and 1B. If it is determined in step 634, that the cycle frequency 354 is greater than the target, then control is transferred to step 636; otherwise control is transferred to step 638.

In step 636, the coupling is adjusted to increment the load level. In some embodiments this involves increasing the PWM loading to the control gate 108 or variable load 116. In step 638, the coupling is adjusted to decrement the load level. In some embodiments this involves decreasing the PWM loading to the control gate 108 or variable load 116.

Figure 6C:
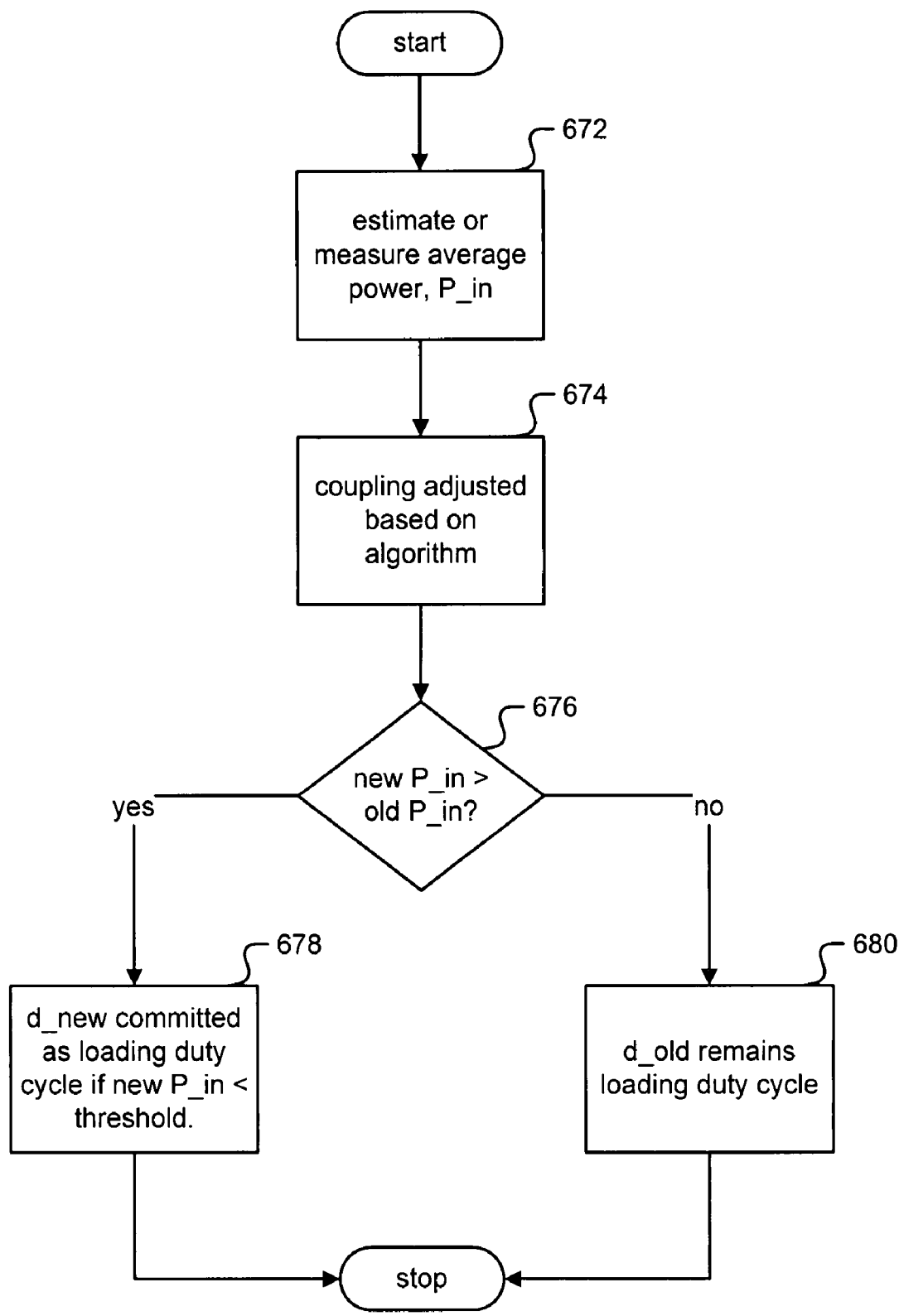
FIG. 6C is a flowchart illustrating a method for adjusting the coupling of the mechanical power source through the electrical power generator to the electrical load to target keeping the average output power of the electrical power generator below a specified threshold.

FIG. 6C is a flowchart illustrating a method for adjusting the coupling of the mechanical power source through the electrical power generator to the electrical load to target keeping the average output power of the electrical power generator below a specified threshold. In some embodiments, the process of FIG. 6C is included in 404 of FIG. 4. The process may be implemented in controller and memory 112. In various embodiments, these steps may be omitted or performed in a different order.

In step 672, the input signal to controller and memory 112 is processed to estimate or measure the average power from the electrical power generator 104 in FIGS. 1A and 1B or from rectifier 106 in FIG. 1C. In step 674, the coupling is adjusted based on an algorithm. In some embodiments, a two-point random walk adaptive loading algorithm is used:

1 Start with an initial loading duty cycle, d_old.
2 Run an entire pacing interval at d_old.
3 Now, randomly or pseudo-randomly step d either up or down by a small amount delta to arrive at d_new=d_old +/−delta.
4 Run another pacing interval at d_new.
5 If it is determined at step 676 that the average power at d_new is greater than that at d_old, then control is transferred to step 678; otherwise, control is transferred to step 680. In step 678, d_new is committed as the loading duty cycle and replaces d_old only if the average power at d_new falls below the specified threshold. In step 680, d_old remains the loading duty cycle.

Figure 7:
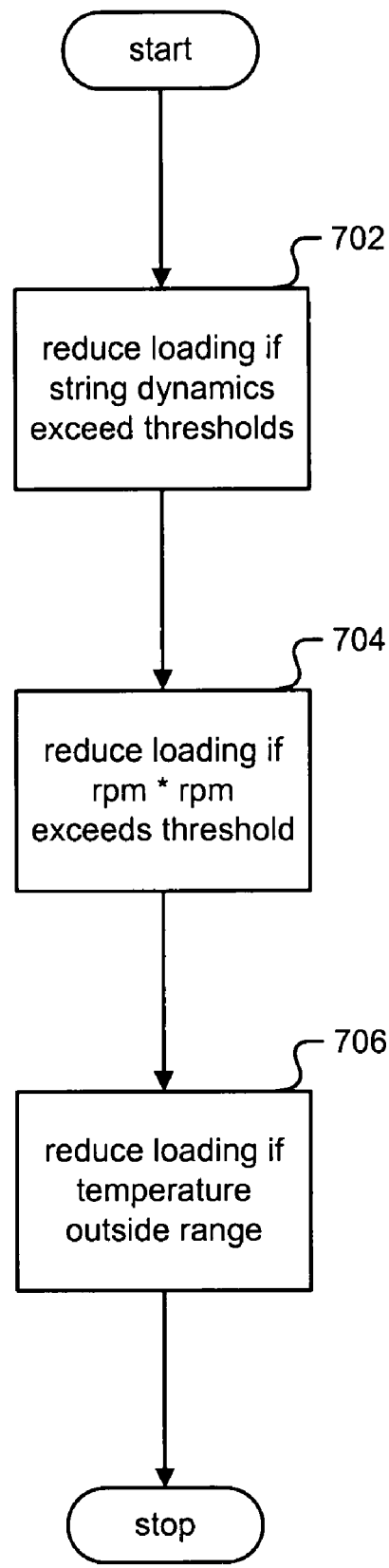
FIG. 7 is a flowchart illustrating a method for adjusting the coupling of the mechanical power source through the electrical power generator to the electrical load increases the electrical power generator lifetime.

FIG. 7 is a flowchart illustrating a method for adjusting the coupling of the mechanical power source through the electrical power generator to the electrical load increases the electrical power generator lifetime. In some embodiments, the process of FIG. 7 is included in 404 of FIG. 4. The process may be implemented in controller and memory 112. In various embodiments, these steps may be omitted or performed in a different order.

In step 702, the controller and memory 112 reduce loading if the mechanical power source dynamics exceed thresholds. Examples of mechanical power source dynamics include:

1. detecting a dead start at the early part of a generation cycle;
2. avoiding a resonance that harms the system by avoiding a generation cycle frequency; and
3. detecting too much tension on the mechanical power source.

Using the techniques that use FIG. 3A and FIG. 3B to calculate generation frequency 354 or integrating the area under the electrical output 356, the mechanical power source dynamics are estimated or determined and compared to the applicable threshold. If the threshold is exceeded, the loading duty cycle is reduced.

In step 704, the controller and memory 112 reduce loading if the generation frequency squared exceeds a specified threshold. The potential damage to the electrical power generator increases as a function of the generation frequency squared, so the controller and memory 112 calculate generation frequency 354 squared and compare to the specified threshold. If the threshold is exceeded, the loading duty cycle is reduced.

In step 706, the controller and memory 112 reduce loading if a temperature sensor for the system or electrical power generator 104 senses a value outside a specified operating range. If the value of the current temperature is outside the specified range, the loading duty cycle is reduced.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
   a mechanical power source;
   an electrical power generator configured to receive input from the mechanical power source;
   an electrical load configured to receive output from the electrical power generator;
   a controller and a memory associated with the controller, wherein the memory is configured to provide the controller with instructions which when executed cause the controller to:
   measure a characteristic of an electrical output from the electrical power generator produced during a first power generation cycle; and
   adjust a coupling of the mechanical power source through the electrical power generator to the electrical load during a subsequent power generation cycle based at least in part on the characteristic of the electrical output measured during the first power generation cycle.

2. The system as recited in claim 1, wherein the mechanical power source is of human or animal effort.

3. The system as recited in claim 1, wherein the memory is configured to provide the controller with instructions which when executed cause the controller to adjust the coupling of the mechanical power source through the electrical power generator to the electrical load to increase the average output power of the electrical power generator attainable by the mechanical power source at a given level of effort.

4. The system as recited in claim 1, wherein the memory is configured to provide the controller with instructions which when executed cause the controller to adjust the coupling of the mechanical power source through the electrical power generator to the electrical load to enhance the capacity of the mechanical power source to generate electrical power using the electrical power generator.

5. The system as recited in claim 1, wherein the memory is configured to provide the controller with instructions which when executed cause the controller to adjust the coupling of the mechanical power source through the electrical power generator to the electrical load to target maintaining a desired cycle frequency of the electrical power generator.

6. The system as recited in claim 1, wherein the memory is configured to provide the controller with instructions which when executed cause the controller to adjust the coupling of the mechanical power source through the electrical power generator to the electrical load to target keeping the average output power of the electrical power generator below a specified threshold.

7. The system as recited in claim 1, wherein the memory is configured to provide the controller with instructions which when executed cause the controller to adjust the coupling of the mechanical power source through the electrical power generator to the electrical load to increase the electrical power generator lifetime.

8. The system as recited in claim 1, wherein the memory is configured to provide the controller with instructions which when executed cause the controller to adjust the coupling of the mechanical power source through the electrical power generator to the electrical load to keep the electrical power generator's temperature from exceeding a threshold.

9. The system as recited in claim 1, wherein the mechanical power source is of human or animal effort and the memory is configured to provide the controller with instructions which when executed cause the controller to adjust the coupling of the mechanical power source through the electrical power generator to the electrical load to enhance human or animal comfort.

10. The system as recited in claim 1, wherein the mechanical power source is of human or animal effort and the memory is configured to provide the controller with instructions which when executed cause the controller to adjust the coupling of the mechanical power source through the electrical power generator to the electrical load to enhance human or animal comfort by regulating an effort profile.

11. The system as recited in claim 1, wherein the electrical load is a battery being charged.

12. The system as recited in claim 1, wherein the memory is configured to provide the controller with instructions which when executed cause the controller to adjust the coupling of the mechanical power source through the electrical power generator to the electrical load by modulating a control gate to the electrical load.

13. The system as recited in claim 1, wherein the memory is configured to provide the controller with instructions which when executed cause the controller to adjust the coupling of the mechanical power source through the electrical power generator to the electrical load by modulating a control gate to the electrical load using PWM.

14. The system as recited in claim 1, wherein the memory is configured to provide the controller with instructions which when executed cause the controller to adjust the coupling of the mechanical power source through the electrical power generator to the electrical load by selectively connecting windings in the electrical power generator.

15. The system as recited in claim 1, wherein the memory is configured to provide the controller with instructions which when executed cause the controller to adjust the coupling of the mechanical power source through the electrical power generator to the electrical load by using a random walk algorithm.

16. The system as recited in claim 1, wherein the memory is configured to provide the controller with instructions which when executed cause the controller to adjust the coupling of the mechanical power source through the electrical power generator to the electrical load by using a user feedback device.

17. The system as recited in claim 16, wherein the user feedback device comprises one or more of the following:
   a. an LED display, an audible pulse, or a tactile pulse.

18. The system as recited in claim 1, wherein the memory is configured to provide the controller with instructions which when executed cause the controller to adjust the coupling of the mechanical power source through the electrical power generator to the electrical load to improve ergonomics for the user.

19. The system as recited in claim 1, wherein the memory is configured to provide the controller with instructions which when executed cause the controller to adjust the coupling of the mechanical power source through the electrical power generator to the electrical load to avoid a resonance.

20. The system as recited in claim 1, wherein the memory is configured to provide the controller with instructions which when executed cause the controller to adjust the coupling of the mechanical power source through the electrical power generator to the electrical load to avoid a dead start at an early part of a generation cycle.

21. The system as recited in claim 1, wherein the memory is configured to provide the controller with instructions which when executed cause the controller to adjust the coupling of the mechanical power source through the electrical power generator to the electrical load to keep a tension on the mechanical power source below a threshold.

22. The system as recited in claim 1, wherein the memory is configured to provide the controller with instructions which when executed cause the controller to adjust the coupling of the mechanical power source through the electrical power generator to the electrical load to keep a generation frequency of the electrical power generator's from exceeding a threshold.

23. The system as recited in claim 1, wherein the memory is configured to provide the controller with instructions which when executed cause the controller to adjust the coupling of the mechanical power source through the electrical power generator to the electrical load based on a user selectable optimization target.

24. A method comprising:
   measuring a characteristic of an electrical output from an electrical power generator produced during a first power generation cycle,
   wherein the electrical power generator is configured to receive input from a mechanical power source and an electrical load is configured to receive output from the electrical power generator; and
   adjusting the coupling of the mechanical power source through the electrical power generator to the electrical load during a subsequent power generation cycle based at least in part on the characteristic of the electrical output measured during the first power generation cycle.

25. The method as recited in claim 24, wherein the mechanical power source is of human or animal effort.

26. The method as recited in claim 24, wherein adjusting the coupling of the mechanical power source through the electrical power generator to the electrical load increases the average output power of the electrical power generator attainable by the mechanical power source at a given level of effort.

27. The method as recited in claim 24, wherein adjusting the coupling of the mechanical power source through the electrical power generator to the electrical load enhances the capacity of the mechanical power source to generate electrical power using the electrical power generator.

28. The method as recited in claim 24, wherein the mechanical power source is of human or animal effort and adjusting the coupling of the mechanical power source through the electrical power generator to the electrical load enhances human or animal comfort.

29. The method as recited in claim 24, wherein the electrical load is a battery being charged.

* * * * *